United States Patent
El-Assir et al.

(10) Patent No.: US 11,609,343 B2
(45) Date of Patent: Mar. 21, 2023

(54) SIGNAL GENERATION SYSTEM AS WELL AS METHOD OF SIGNAL GENERATION

(71) Applicant: Rohde & Schwarz GmbH & Co. KG, Munich (DE)

(72) Inventors: Rachid El-Assir, Munich (DE); Rainer Lenz, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 66 days.

(21) Appl. No.: 17/168,454

(22) Filed: Feb. 5, 2021

(65) Prior Publication Data
US 2021/0247525 A1   Aug. 12, 2021

(30) Foreign Application Priority Data
Feb. 7, 2020   (EP) .................................. 20156187

(51) Int. Cl.
*G01S 19/42*   (2010.01)
*G01S 19/39*   (2010.01)

(52) U.S. Cl.
CPC .......... *G01S 19/428* (2013.01); *G01S 19/396* (2019.08); *G01S 19/425* (2013.01)

(58) Field of Classification Search
CPC ...... G01S 19/428; G01S 19/03; G01S 19/396; G01S 19/425; G01S 19/30; G01S 19/23; G01S 19/32; G01S 19/37; H04B 1/7073; H04B 1/707
See application file for complete search history.

(56) References Cited

U.S. PATENT DOCUMENTS

| | | | | |
|---|---|---|---|---|
| 5,953,367 | A * | 9/1999 | Zhodzicshsky | G01S 19/29 375/147 |
| 6,608,589 | B1 * | 8/2003 | Devereux | G01S 19/37 701/13 |
| 8,401,546 | B2 * | 3/2013 | Landry, Jr. | G01S 19/37 370/316 |

(Continued)

OTHER PUBLICATIONS

"Bring satellites into your lab GNSS simulators from the T&M expert," Rohde & Schwarz GmbH & Co. KG, München, Germany, Jun. 30, 2019, 7 pages. (Year: 2019).*

(Continued)

*Primary Examiner* — Erin F Heard
*Assistant Examiner* — Kenneth W Good
(74) *Attorney, Agent, or Firm* — Christensen O'Connor Johnson Kindness PLLC

(57) ABSTRACT

A signal generation system for signal simulation includes at least one data input, a pulse description word generator, a multi-frequency signal generator, and at least one radio frequency output. The multi-frequency signal generator is configured to simulate a multi-frequency global navigation satellite system signal. The pulse description word generator and the multi-frequency signal generator are assigned to the data input in order to process data received via the data input. The pulse description word generator and the multi-frequency signal generator are configured to generate an output signal based on at least one instruction for a certain generator behavior of the pulse description word generator and/or the multi-frequency signal generator. The at least one instruction is encompassed in the data received. Further, a method of signal generation is described.

15 Claims, 1 Drawing Sheet

(56) References Cited

U.S. PATENT DOCUMENTS

| | | | |
|---|---|---|---|
| 9,857,476 B2* | 1/2018 | Mathews | G01S 19/215 |
| 10,884,136 B2* | 1/2021 | Anderson | G01S 19/243 |
| 11,073,622 B2* | 7/2021 | Cohen | G01S 19/42 |
| 11,125,889 B2* | 9/2021 | Veitsel | H04B 1/70757 |
| 2002/0101912 A1* | 8/2002 | Phelts | H04B 1/711 |
| | | | 375/E1.032 |
| 2010/0127918 A1* | 5/2010 | Vadlamani | G01S 19/23 |
| | | | 342/357.62 |

OTHER PUBLICATIONS

"Hardware in the Loop (HIL) Testing with a GNSS Simulator Application Note," Rohde & Schwarz GmbH & Co. KG, München, Germany, Nov. 30, 2015, 25 pages. (Year: 2015).*

"Pulse descriptor word streaming with the ® SMW200A," Rohde & Schwarz GmbH & Co. KG, München, Germany, Feb. 28, 2018, 2 pages. (Year: 2018).*

"R&S® SMW200A Vector Signal Generator Specifications," Rohde & Schwarz GmbH & Co. KG, München, Germany, Aug. 31, 2019, 88 pages. (Year: 2019).*

"R&S® SMW200A Vector Signal Generator The fine art of signal generation," Rohde & Schwarz GmbH & Co. KG, München, Germany, Jan. 31, 2020, 32 pages. (Year: 2020).*

"Bring satellites into your lab GNSS simulators from the T&M expert," Rohde & Schwarz GmbH & Co. KG, München, Germany, Jun. 30, 2019, 7 pages.

"Hardware in the Loop (HIL) Testing with a GNSS Simulator Application Note," Rohde & Schwarz GmbH & Co. KG, München, Germany, Nov. 30, 2015, 25 pages.

"Pulse descriptor word streaming with the ® SMW200A," Rohde & Schwarz GmbH & Co. KG, München Germany, Feb. 28, 2018, 2 pages.

"R&S® SMW200A Vector Signal Generator User Manual," Rohde & Schwarz GmbH & Co. KG, München, Germany, Dec. 31, 2018, 1343 pages.

"R&S® SMW200A Vector Signal Generator The fine art of signal generation," Rohde & Schwarz GmbH & Co. KG, München, Germany, Jan. 31, 2020, 32 pages.

"R&S® SMW200A Vector Signal Generator Specifications," Rohde & Schwarz GmbH & Co. KG, München, Germany, Aug. 31, 2019, 88 pages.

* cited by examiner

SIGNAL GENERATION SYSTEM AS WELL AS METHOD OF SIGNAL GENERATION

FIELD OF THE DISCLOSURE

Embodiments of the present disclosure relate to a signal generation system for signal simulation. Further, embodiments of the present disclosure relate to a method of signal generation by a signal generation system.

BACKGROUND

In modern times, wireless communication using radio frequency signals becomes more important.

Different communication systems use different kinds of signals, which in turn increases the efforts required for testing the respective communication devices. For instance, a mobile phone uses several different wireless communication techniques for establishing different communication links. When testing a mobile phone, the several communication techniques used have to be tested in order to verify proper operation of the mobile phone. Other communication devices may use global navigation satellite system (GNSS) signals and radar signals, which have to be tested in order to verify proper operation of the respective communication device.

In addition to the testing procedures to be performed for testing a certain communication device, the number of test instruments required for performing the respective tests on a certain device under test also increases. This results in high costs for testing a respective communication device, as several different test instruments have to be purchased in advance.

SUMMARY

Accordingly, there is a need for a cost-efficient manner that ensures proper testing of a device under test.

Embodiments of the present disclosure provide a signal generation system for signal simulation. In an embodiment, the signal generation system comprises at least one data input for receiving data, a pulse description word (PDW) generator unit for generating a pulse description word signal, a multi-frequency signal generator unit for generating a multi-frequency signal, and at least one radio frequency output. The multi-frequency signal generator unit is configured to simulate a multi-frequency global navigation satellite system (GNSS) signal. The pulse description word generator unit as well as the multi-frequency signal generator unit are assigned to the data input in order to process data received via the data input. The pulse description word generator unit as well as the multi-frequency signal generator unit are configured to generate a respective output signal based on at least one instruction for a certain generator behavior of the pulse description word generator unit and/or the multi-frequency signal generator unit, wherein the at least one instruction is encompassed in the data received.

Further, embodiments of the present disclosure provide a method of signal generation by a signal generation system comprising a pulse description word generator unit and a multi-frequency signal generator unit. In an embodiment, the method comprises the steps of:

receiving data via at least one data input, wherein the data comprises at least one instruction for a certain generator behavior of the pulse description word generator unit and/or the multi-frequency signal generator unit, processing the at least one instruction encompassed in the data received by the pulse description word generator unit and/or the multi-frequency signal generator unit, and generating an output signal by the pulse description word generator unit and/or the multi-frequency signal generator unit depending on the instruction provided in the data received.

Accordingly, the signal generation system is enabled to perform, for example, the respective method described above. In some embodiments, the signal generation system comprises two different architectures, namely the GNSS architecture as well as the PDW architecture. These different signal generator architectures are combined within the signal generation system simultaneously. The entire signal generation system has the at least one data input for receiving respective data that can be forwarded to at least one of the respective generator units for generating a signal to be outputted.

The signal generator system may comprise a housing that encompasses the pulse description word generator unit and the multi-frequency signal generator unit. Put differently, the respective generator units or rather the respective signal generator architectures are commonly housed in the same housing of the signal generator system.

Thus, the at least one radio frequency output and/or the at least one data input may be assigned to an outer surface of the respective housing, ensuring easy access for an operator of the signal generator system.

The respective data received encompasses instructions that can be processed by the generator unit(s) such that its/their behavior is adapted based on the respective instruction processed. The instructions may be assigned to a scenario description used for simulating purposes. Thus, the data received may be called scenario data. In other words, a respective signal of a certain entity is simulated by the signal generation system, wherein the respective instruction encompassed in the data received defines the respective simulation scenario.

The scenario description may define a respective waveform of the output signal generated by the signal generation system. In other words, the waveform of the signal generated depends on the respective scenario to be simulated that is defined by the scenario description or rather the instruction. Alternatively or additionally, the respective scenario description may define other parameters than the waveform, which are associated with the respective scenario to be simulated.

Accordingly, the signal generation system is configured to generate an output signal that corresponds to a signal that simulates or rather emulates a respective entity. The output signal generated depends on the data received via the at least one data input. The data received encompasses the at least one instruction that, when processed by at least one of the generator units, causes the respective generator unit(s) to adapt its/their respective behavior (settings) in order to generate the output signal in a manner that complies with the respective scenario intended.

Since the signal generation system comprises two different signal generation architectures established by the PDW generator unit and the multi-frequency signal generator unit, two (different) baseband boards may be provided. Each baseband board may have a field programmable gate array (FPGA), an application-specific integrated circuit (ASIC) or a digital signal processor (DSP), which is connected to a digital to analog converter (DAC). In other words, each baseband board has its own hardware means connected with the DAC. The DAC may relate to a wideband DAC allowing at least 500 MHz bandwidth.

Further, the signal generation system, for example each baseband board, may comprise an IQ modulator that is used to modulate a respective baseband signal provided by the DAC. The operator of the signal generation system may set a certain carrier frequency as well as a certain total power, which are taken in consideration when modulating the baseband signal appropriately by the IQ modulator.

In some embodiments, the data may encompass at least one pulse description word (PDW) scenario allowing the operator to simulate a radar scenario. This radar scenario may be created with an external device, for instance an external software. The external device/software may provide the data associated with the pulse description word scenario, namely the scenario data, wherein the (scenario) data is internally processed by the PDW generator unit, e.g., the corresponding baseband of the signal generation system. Then, the PDW generator unit processing the data associated with the pulse description word scenario, namely the scenario data, generates/calculates pulse description words (PDWs) based on the data received, wherein the PDWs are processed such that at least one PDW signal is obtained. For this purpose, a baseband signal is modulated correspondingly by the PDWs calculated, for instance on an operator-defined carrier frequency and using an operator-defined power level.

The data, namely the scenario data, may also encompass at least one multi-frequency GNSS scenario, for example a very long one. This GNSS scenario includes the simulation of satellite signals on the L band, for instance L1, L2 and/or L5. Moreover, the GNSS scenario may comprise the coherent propagation of these signals. The respective architecture of the baseband board for GNSS applications allows the simultaneous simulation of all signals transmitted from the same satellite on the same baseband board. Signals from different satellites are added in the baseband board.

Generally, the signal generation system may relate to a vector signal generator having two different signal generator architectures.

According to an aspect, in a first operation mode of the signal generation system, the signal generation system is configured to output the multi-frequency global navigation satellite system signal via the radio frequency output. In a second operation mode of the signal generation system, the signal generation system is configured to output the pulse description word signal via the radio frequency output. Accordingly, the PDW signal corresponds to an RF signal. Thus, the signal generation system may comprise at least two different operation modes in which only one of both generator units is active. This means that only one of both generator units generates a signal to be outputted.

Depending on the data received via the data input, the signal generation system may be operated in its first operation mode or its second operation mode, for example automatically due to the respective kind of data received. The data received via the data input is processed by the multi-frequency signal generator unit in the first operation mode in order to output the multi-frequency global navigation satellite system signal. In the second operation mode, the respective data is processed by the pulse description word generator unit such that the signal generation system outputs the pulse description word signal.

In the first operation mode, only the multi-frequency signal generator unit is active, resulting in the multi-frequency global navigation satellite system signal outputted. Hence, the output signal corresponds to a multi-frequency global navigation satellite system signal generated by the multi-frequency signal generator unit.

In the second operation mode, only the pulse description word generator unit is active, resulting in the pulse description word signal outputted. Hence, the output signal corresponds to a pulse description word signal generated by the pulse description word generator unit.

According to another aspect, in a third operation mode of the signal generation system, the signal generation system is configured to simultaneously output the multi-frequency global navigation satellite system signal and the pulse description word signal. The respective signals may be outputted simultaneously by using two different radio frequency paths. Accordingly, the signal generation system has two radio frequency paths allowing to generate GNSS signals as well as PDW signals simultaneously. Hence, the size and costs are reduced, as two different kinds of signals can be simulated or rather generated simultaneously by the single signal generation system.

In an alternative embodiment, a composite signal is outputted via the (single) radio frequency output, which encompasses the multi-frequency global navigation satellite system signal and the pulse description word signal. Thus, a single signal, namely the composite signal, is outputted via the single radio frequency output, wherein the respective composite signal encompasses both signals generated by the different generator units.

Furthermore, a multiplexer may be provided that is used to multiplex the respective signals, for example the different GNSS signals.

In the third operation mode, both generator units are active, namely the multi-frequency signal generator unit as well as the pulse description word generator unit. Hence, the output signal corresponds to a multi-frequency global navigation satellite system signal and a pulse description word signal, which are generated by the multi-frequency signal generator unit and the pulse description word generator unit, respectively, in particular wherein the output signal is a composite signal.

Another aspect provides that the signal generation system is configured to be switchable between different operation modes. The signal generation system has at least three different operation modes, namely a single GNSS operation mode, a single PDW operation mode as well as a simultaneous operation mode. The signal generation system can be switched between these different operation modes. Hence, signal generation system can be switched between a single radio frequency signal output (first operation mode and second operation mode) as well as the multiple signal output (third operation mode). In case of different radio frequency signal paths and radio frequency outputs assigned thereto, the number of active radio frequency outputs can be switched appropriately.

The switching may be done manually by the operator of the signal generation system. Alternatively or additionally, the switching is done by the data received and processed, namely in an automatic manner.

Furthermore, the pulse description word generator unit and the multi-frequency signal generator unit are configured to synchronize themselves with each other. Hence, it is ensured that the signals outputted by the signal generation system are temporarily aligned with each other due to the synchronization. This is particularly important in the third operation mode since the GNSS signal(s) as well as the PDW signal(s) may be outputted simultaneously. However, this is also important if several PDW signals or GNSS signals are transmitted in the respective scenario simulated.

For instance, the synchronization between the generator units is based on timing information received via the data input. Thus, the data may also encompass timing information, yielding the synchronization of the generator unit(s) or the signal generator architectures.

A communication line may be established between both generator units, which ensures their synchronization.

In some embodiments, the timing information is processed by the pulse description word generator unit and/or the multi-frequency signal generator unit in order to synchronize themselves with each other in time with regard to outputting the output signal.

Another aspect provides that the signal generator system is configured to operate in real time. As mentioned earlier, the respective components of the signal generation system may be established by hardware means, for instance the FPGA, the ASIC or the DSP. The hardware means ensures real time processing of the data and, therefore, outputting the output signal in real time.

The output signal, for example the multi-frequency global navigation satellite system signal, has different frequency bands, for example frequency bands assigned to L band. For instance, an L1, L2 and/or L5 band may be used by the output signal, for example the GNSS signal. Accordingly, the multi-frequency global navigation satellite system signal may relate to a multiplexed signal or rather a composite signal.

Further, the output signal may be a coherent output signal. Since the generator units can synchronize themselves with each other, it can be ensured that the output signal is a coherent signal. In case of the multiplexed or multi-frequency global navigation satellite system signal, the respective signal portions assigned to the different frequencies, for example L bands, are coherent.

Another aspect provides that the at least one instruction for the certain generator behavior of the pulse description word generator unit and/or the multi-frequency signal generator unit corresponds to a scenario description. As mentioned above, the scenario description may relate to a certain scenario of a simulation or rather emulation. In some embodiments, motion data or body mask may be associated with the respective scenario description. The motion data may relate to position, velocity, acceleration and/or jerk of a certain object simulated, for example within a radar scenario. The body mask may be used for land vehicles, ships, aircraft and spacecraft, for example for defining the respective radar cross section.

In general, the scenario description, namely the instruction associated therewith, is used for signal and/or waveform calculation. Thus, the respective scenario intended for the simulation or rather emulation is achieved by the respective scenario description influencing the signal and/or waveform calculation.

In general, PDW data, namely the pulse description words (PDWs), may be generated by the PDW generator unit based on the data received via the data input. The PDW generator unit may directly process the PDW data, namely the PDWs, in order to generate the PDW signal.

Typically, data associated with PDW comprises information like time of arrival, frequency offset, phase offset, amplitude (attenuation) and/or segment/timing information. This information is processed to determine the time at which the PDW signal is outputted as well as it properties regarding frequency offset, phase offset and its amplitude.

For instance, the data associated with PDW, namely the data processed by the pulse description word (PDW) generator unit, contains radar signal parameters for each pulse together with a time stamp that defines the pulse start time. Hence, scenarios can easily contain millions of PDWs, wherein each PDW represents one pulse.

Thus, I/Q modulated pulsed signals, unmodulated pulses, Barker coded pulses, LFM pulses (chirps) together with frequency offsets or amplitude offsets are generated in real-time based on the parameters defined in the data associated with the PDW.

Furthermore, mixing data associated with PDW is possible, resulting in a mixed signal assigned to classical pulsed signals with modern radar signals that are often I/Q modulated.

In some embodiments, the signal generation system has (only) a single data input. Accordingly, the signal generation system receives via the single data input the respective data for signal simulation, wherein the data received encompasses instructions for both the pulse description word (PDW) generator unit and the multi-frequency signal generator unit. As mentioned above, the respective instruction is assigned to a scenario description used for simulating purposes, as the instructions encompassed in the data received are processed by the generator units appropriately. Accordingly, the data received corresponds to scenario data.

In other words, the data to be processed by both generator units relate to a single data set that is received via the single data input. The single data set provides at least one instruction for the pulse description word (PDW) generator unit to generate the PDW signal as well as at least one instruction for the multi-frequency signal generator unit to generate the GNSS signal.

Accordingly, the data of the single data set received via the single data input is internally split by the signal generation system, for example a processing circuit, thereby obtaining at least two data portions. A first data portion associated with at least one pulse description word (PDW) scenario is forwarded to the pulse description word (PDW) generator unit and a second data portion associated with at least one multi-frequency GNSS scenario is forwarded to the multi-frequency signal generator unit.

Generally, the PDW scenario and the GNSS scenario may together form a common scenario that encompasses instructions for both the PDW generator unit and the GNSS generator unit.

The respective generator units each process the data related to the respective data portions in order to generate the PDW signal and the GNSS signal with the respective characteristics defined in the corresponding scenario(s).

In other words, the single data set received via the single data input encompasses data that can be split into two data portions, wherein each data portion is associated with at least one specific instruction processed by the corresponding generator unit. In some embodiments the data of the single data set encompasses data associated with the pulse description word (PDW) scenario as well as data associated with the multi-frequency GNSS scenario.

In some embodiments, the PDW generator unit receives the data associated with the corresponding instruction, wherein the PDW generator unit generates the PDW signal based on the data received. Thus, the PDW generator unit processes the data received, thereby obtaining pulse description words that are internally processed in order to generate the PDW signal.

Accordingly, the PDW generator unit does not receive a stream of PDWs from an external device, for example an external software, as the PDWs are (internally) generated/calculated by the PDW generator unit based on the data received via the single data input of the signal generation system, namely the scenario data.

Hence, the PDW generator unit comprises a processing circuit in some embodiments that is configured to receive and process the scenario data, for example the data associated with the PDW scenario, in order to calculate the PDWs, namely PDW data. The PDWs calculated are internally processed by the PDW generator unit, thereby generating the PDW signal that can be outputted.

Again, the data received via the data input relates to scenario data, namely data describing at least one scenario. The respective scenario data is internally processed by the signal generation system in order to generate the respective radio frequency (RF) signal(s).

In some embodiments, the PDW generator unit processes the scenario data received in order to calculate/generate the PDWs that are internally used to generate the PDW signal.

Accordingly, the data received, namely the scenario data, is processed by the PDW generator unit to calculate PDWs and to generate the RF signal. Further, the data received, namely the scenario data, is processed by the multi-frequency GNSS generator unit to produce a waveform and the RF signal corresponding to the waveform produced.

In some embodiments, the term "module" or "unit" as used herein refers to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
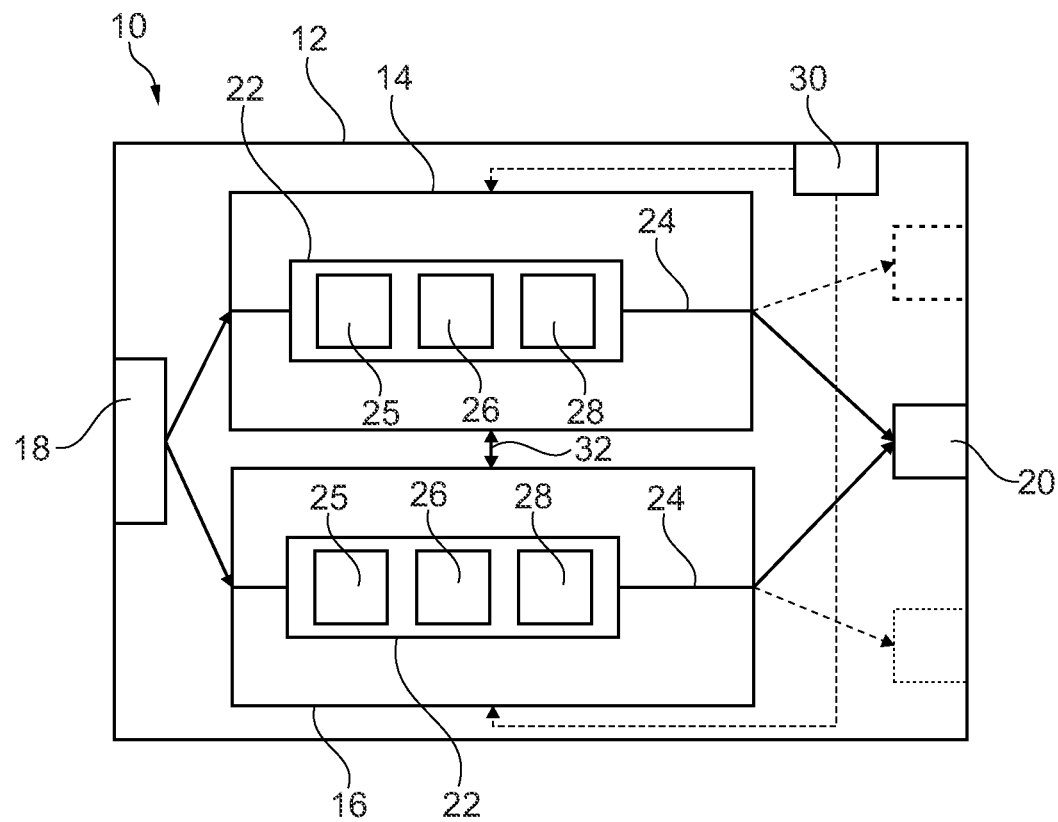
FIG. 1 schematically shows a signal generation system according to an embodiment of the present disclosure.

In FIG. 1, a signal generation system 10 is shown that is used for signal simulation, namely simulating or emulating a certain scenario for testing a device under test exposed to the respective scenario simulated. The signal generation system 10 has a housing 12 that encompasses a pulse description word (PDW) generator unit 14 for generating a pulse description word signal as well as a multi-frequency signal generator unit 16 for generating a multi-frequency signal, for example a multi-frequency global navigation satellite system (GNSS) signal. Accordingly, the respective generator units 14, 16, namely the PDW generator unit 14 and the GNSS generator unit 16, correspond to different signal generator architectures.

The signal generation system 10 also includes at least one data input 18 for receiving data that can be processed by the respective generator units 14, 16 as will be described later. In the shown embodiment, a single data input 18 is shown. The signal generation system 10 further includes at least one radio frequency output 20 that is assigned with the generator units 14, 16 such that the respective signal generated by at least one of the generator units 14, 16 can be outputted via the radio frequency output 20.

In general, the signal generation system 10 comprises two baseband boards 22 as well as two radio frequency paths 24. In some embodiments, each baseband board 22 comprises hardware means 25, for example, a field programmable gate array (FPGA), an application-specific integrated circuit (ASIC) or a digital signal processor (DSP), which is connected to a wideband digital to analog converter (DAC) 26 that allows a bandwidth of at least 500 MHz.

Further, an IQ modulator 28 is provided that is assigned to the respective signal path originating from the DAC 26. The DAC 26 provides a baseband signal that is modulated by the IQ modulator 28.

An operator of the signal generation system 10 may select a certain carrier frequency and/or a desired total power via an interface 30 that is connected with the IQ modulator 28. Thus, the operator of the signal generation system 10 is generally enabled to define the carrier frequency as well as the total power manually of the respective output signal.

The generator units 14, 16 may be connected via their respective radio frequency paths 24 with a single radio frequency output 20 (solid lines) or with two radio frequency outputs 20 (dashed lines).

Figure 2:
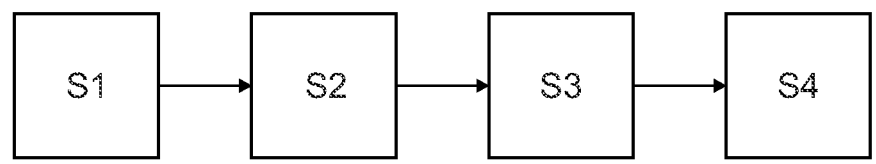
FIG. 2 shows a flow-chart illustrating a method of signal generation according to an embodiment of the present disclosure.

Generally, the signal generation system 10 is enabled to generate an output signal by conducting a method of signal generation, an example of which as schematically illustrated in FIG. 2.

In a first step S1, data is received via the at least one data input 18 wherein the data received comprises at least one instruction for a certain generator behavior of the pulse description word generator unit 14 and/or the multi-frequency signal generator unit 16. In some embodiments, the data received corresponds to scenario data that describes at least one scenario.

The respective generator units 14, 16 are connected with the data input 18 such that the data received can be forwarded to the respective generator units 14, 16 for being processed appropriately.

The data received may relate to common data or rather a single data set. Thus, the single data set may encompass data that can be split into two data portions, e.g. by a processing circuit. Each data portion is associated with at least one specific instruction processed by the corresponding generator unit 14, 16. For example the data of the single data set encompasses data associated with a pulse description word (PDW) scenario as well as data associated with a multi-frequency GNSS scenario.

In a second step S2, the at least one instruction encompassed in the data received is processed by the pulse description word generator unit 14 and/or the multi-frequency signal generator unit 16. In some embodiments, it depends on the kind of instruction if the PDW generator unit 14 solely or the multi-frequency signal generator unit 16 solely processes the respective instruction or if both generator units 14, 16 process the respective instruction(s).

The at least one instruction encompassed in the data received, when processed by at least one of the generator units 14, 16, causes the respective generator unit(s) 14, 16 to adapt its/their respective behavior in order to generate the output signal of the signal generation system 10 in a manner that complies with the respective scenario intended. Accordingly, settings of the generator unit(s) 14, 16 may be adapted in order to adapt the respective behavior of the generator unit(s) 14, 16.

In a third step S3, the output signal is generated by the pulse description word generator unit 14 and/or the multi-frequency signal generator unit 16. The respective output signal, for example its characteristics like waveform, depends on the data received, for example the respective instruction(s) encompassed in the data received.

Therefore, the output signal of the signal generation system 10 may be different depending on the data received or rather the instruction(s) encompassed in the data.

In a fourth step S4, the output signal generated is forwarded to the at least one radio frequency output 20 such that the output signal is outputted via the at least one radio frequency output 20.

Accordingly, the signal generation system 10 has different operation modes that depend on the respective data processed, namely the instruction(s) causing the respective generator unit(s) 14, 16 to adapt its/their behavior.

In general, the pulse description word generator unit 14 as well as the multi-frequency signal generator unit 16 are configured to generate the respective output signal based on the at least one instruction for the certain generator behavior, namely the scenario data received.

In a first operation mode, the signal generation system 10 outputs the multi-frequency global navigation satellite system (GNSS) signal via the radio frequency output 20, as the instruction causes (only) the multi-frequency signal generator 16 to process the respective data in order to generate the multi-frequency signal, namely the multi-frequency GNSS signal.

For instance, very long multi-frequency GNSS scenarios including simulation of satellite signals on the L band, namely L 1, L2 and/or L5, as well as coherent propagation of these signals are simulated. In some embodiments, the multi-frequency signal generator unit 16 allows the simultaneous simulation of all signals transmitted from a satellite on the same baseband board 22. In addition, signals from different satellites can be added in the respective baseband board 22.

In a second operation mode, the signal generation system 10 outputs the pulse description word signal via the radio frequency output 20, as the respective instruction causes (only) the pulse description word generator 14 to process the respective data and to output the pulse description word signal.

For instance, PDW scenarios generally allow the operator of the signal generation system 10 to simulate potentially a radar scenario. For instance, the PDW generator unit 14 processes the scenario data that is received by the data input 18, thereby generating pulse description words (PDWs), namely PDW data. Then, the PDW generator unit 14 internally processes the PDW data generated while modulating a baseband signal, for example in accordance with an operator-defined carrier frequency and/or an operator-defined power level. The respective settings can be done manually via the user interface 30.

Hence, the PDW generator unit 14 receives the scenario data via the data input 18 that encompasses instructions. The PDW generator unit 14 processes the data in order to internally calculate PDWs from the data received via the data input 18. Then, the PDW generator unit 14 (internally) processes the PDWs in order to generate the PDW signal, namely the RF signal. Accordingly, the PDW generator unit 14 or rather the signal generation system 10 does not receive a PDW stream from an external device or an external software.

In a third operation mode, the signal generation system 10 simultaneously outputs the multi-frequency global navigation satellite system (GNSS) signal and the pulse description word (PDW) signal. Thus, the respective instruction causes both generator units 14, 16 to process the respective data and to generate the respective signals, namely the pulse description word signal as well as the multi-frequency signal simultaneously.

As mentioned above, the scenario data received is split into two data portions, e.g. by the processing circuit, wherein the data portions are associated with specific instructions processed by the corresponding generator unit, namely data associated with the pulse description word (PDW) scenario as well as data associated with the multi-frequency GNSS scenario.

The respective signals, namely the radio frequency (RF) signals, are generated by the different baseband boards 22, namely the ones associated with the respective generator units 14, 16, wherein the signals generated are processed by the respective radio frequency path 24.

Accordingly, the signal generation system 10 is switchable between the different operation modes. In some embodiments, the switching can be done in a manual manner or automatically based on the kind of data processed or rather received.

Generally, the at least one instruction for the certain generator behavior of the pulse description word generator unit 14 and/or the multi-frequency signal generator unit 16 corresponds to a scenario description that is used for signal and/or waveform calculation of the respective generator unit 14, 16, for example the respective signal generated. For instance, the scenario description may relate to motion data and/or body mask, which are taken into consideration by the respective generator unit(s) 14, 16.

In addition, both generator units 14, 16 are connected with each other, for example, via a communication line 32, which ensures that both generator units 14, 16 are enabled to synchronize themselves with each other. Hence, a temporal alignment can be ensured between both generator units 14, 16 such that a coherent output signal is generated.

The synchronization may take place based on timing information received via the data input 18. In other words, the data received may encompass respective timing information used by the generator units 14, 16.

Since the generator units 14, 16 are established by hardware means, it is ensured that the entire signal generator system 10 can operate in real time. As mentioned above, the hardware means of the generator units 14, 16 may comprise a suitably configured field programmable gate array (FPGA), application-specific integrated circuit (ASIC) or digital signal processor (DSP), for example.

Accordingly, a cost-efficient signal generation system 10 is provided that ensures to simulate behavior of two different types of entity due to the separate architectures integrated.

Certain embodiments disclosed herein, for example the respective module(s) or unit(s) such as generator units 14, 16, utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, one or more of, and in some embodiments, all of the functionality described herein can be implemented by special purpose hardware-based computer systems or circuits, etc., or combinations of special purpose hardware and computer instructions.

Of course, in some embodiments, two or more of components of the system 10, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A signal generation system for signal simulation, wherein the signal generation system comprises:
    a single data input for receiving scenario data;
    a pulse description word (PDW) generator circuit for generating a pulse description word signal;
    a multi-frequency signal generator circuit for generating a multi-frequency signal; and
    at least one radio frequency output,
    wherein the scenario data received via the single data input encompasses instructions for both the pulse description word generator circuit and the multi-frequency signal generator circuit,
    wherein the multi-frequency signal generator circuit is configured to simulate a multi-frequency global navigation satellite system (GNSS) signal,
    wherein the pulse description word generator circuit as well as the multi-frequency signal generator circuit are assigned to the data input in order to process the scenario data received via the single data input,
    wherein the pulse description word generator circuit is configured to generate pulse description word data internally based on the instruction for a certain generator behavior of the pulse description word generator circuit encompassed in the scenario data received via the single data input, wherein the pulse description word generator circuit is further configured to process the pulse description word data generated internally in order to generate a pulse description word signal,
    wherein the multi-frequency signal generator circuit is configured to generate the multi-frequency signal based on the instruction for a certain generator behavior of the multi-frequency signal generator circuit, and
    wherein the composite signal is outputted via the radio frequency output, which encompasses the multi-frequency signal and the pulse description word signal.

2. The signal generation system according to claim 1, wherein, in a first operation mode of the signal generation system, the signal generation system is configured to output the multi-frequency global navigation satellite system signal via the radio frequency output, and wherein, in a second operation mode of the signal generation system, the signal generation system is configured to output the pulse description word signal via the radio frequency output.

3. The signal generation system according to claim 1, wherein the signal generation system is configured to be switchable between different operation modes.

4. The signal generation system according to claim 1, wherein the pulse description word generator circuit and the multi-frequency signal generator circuit are configured to synchronize themselves with each other.

5. The signal generation system according to claim 4, wherein the pulse description word generator circuit and the multi-frequency signal generator circuit are configured to synchronize themselves with each other based on timing information received via the data input.

6. The signal generation system according to claim 1, wherein the signal generator system is configured to operate in real time.

7. A method of signal generation by a signal generation system comprising a pulse description word generator circuit and a multi-frequency signal generator circuit, the method comprising:
receiving scenario data via a single data input, wherein the scenario data comprises an instruction for a certain generator behavior of of the pulse description word generator circuit and an instruction for a certain generator behavior of the multi-frequency signal generator circuit;
processing the instructions encompassed in the scenario data received by of the pulse description word generator circuit and the multi-frequency signal generator circuit;
generating, by the pulse description word generator circuit, pulse description word data internally based on the instruction for the certain generator behavior of the pulse description word generator circuit encompassed in the scenario data received via the single data input,
processing, by the pulse description word generator circuit, the pulse description word data generated internally in order to generate a pulse description word signal,
generating, by the multi-frequency signal generator circuit, a multi-frequency signal based on the instruction for the certain generator behavior of the instruction for the certain generator behavior of the multi-frequency signal generator circuit, and
outputting an output signal via a radio frequency output, wherein the output signal is a composite signal that encompasses the multi-frequency signal and the pulse description word signal.

8. The method according to claim 7, wherein the data also comprises timing information.

9. The method according to claim 8, wherein the timing information is processed by at least one of the pulse description word generator circuit and the multi-frequency signal generator circuit in order to synchronize themselves with each other in time with regard to outputting the output signal.

10. The method according to claim 7, wherein the output signal has different frequency bands.

11. The method according to claim 10, wherein the frequency bands are assigned to L band.

12. The method according to claim 7, wherein the output signal is a coherent output signal.

13. The method according to claim 7, wherein the instruction for the certain generator behavior of the pulse description word generator circuit and the instruction for the certain generator behavior of the multi-frequency signal generator circuit corresponds to a scenario description that is used for at least one of signal and waveform calculation.

14. The method according to claim 13, wherein motion data or body mask is used for signal and/or waveform calculation.

15. A signal generation system for signal simulation, wherein the signal generation system comprises:
a single data input for receiving scenario data;
a pulse description word (PDW) generator circuit for generating a pulse description word signal;
a multi-frequency signal generator circuit for generating a multi-frequency signal; and
at least one radio frequency output,
wherein the multi-frequency signal generator circuit is configured to simulate a multi-frequency global navigation satellite system (GNSS) signal,
wherein the pulse description word generator circuit as well as the multi-frequency signal generator circuit are assigned to the single data input in order to process the scenario data received via the single data input,
wherein the pulse description word generator circuit is configured to generate pulse description word data internally based on an instruction for a certain generator behavior of the pulse description word generator circuit encompassed in the scenario data received via the single data input, wherein the pulse description word generator circuit is further configured to process the pulse description word data generated internally in order to generate a pulse description word signal, and
wherein the multi-frequency signal generator circuit is configured to generate a multi-frequency signal based on an instruction for a certain generator behavior of the multi-frequency signal generator circuit, which is also encompassed in the scenario data received via the single data input.

* * * * *